United States Patent [19]
Hupfer et al.
[11] Patent Number: 4,686,144
[45] Date of Patent: Aug. 11, 1987

[54] HIGH PERFORMANCE PRINTABLE COATINGS FOR IDENTIFICATION DEVICES

[75] Inventors: Bruce A. Hupfer, Hartford; James F. Hubert, Wauwatosa, both of Wis.

[73] Assignee: W. H. Brady Co., Milwaukee, Wis.

[21] Appl. No.: 831,674

[22] Filed: Feb. 21, 1986

[51] Int. Cl.[4] ........................ B32B 15/08; B32B 27/00; B32B 27/08

[52] U.S. Cl. ....................................... 428/421; 428/36; 428/422; 428/458; 428/463; 428/473.5; 428/520

[58] Field of Search ...................... 428/422, 421, 473.5, 428/36, 42, 458, 463, 520; 525/180, 387; 206/343

[56] References Cited

U.S. PATENT DOCUMENTS

| | | | |
|---|---|---|---|
| 4,143,204 | 3/1979 | Fang | 428/422 X |
| 4,214,060 | 7/1980 | Apotheker et al. | 525/387 |
| 4,329,399 | 5/1982 | Siverlick | 428/473.5 X |
| 4,442,939 | 4/1984 | Downing | 206/343 X |
| 4,446,183 | 5/1984 | Savagian | 428/42 |
| 4,461,793 | 7/1984 | Blok et al. | 428/36 |
| 4,599,383 | 7/1986 | Satoji | 525/180 |

*Primary Examiner*—Thomas J. Herbert
*Attorney, Agent, or Firm*—Quarles & Brady

[57] ABSTRACT

A printable coating suitable for identification devices that combines a polyimide and a fluorocarbon elastomer as a film-former binder at a weight ratio of polyimide:fluorocarbon elastomer in the range of about 2:1 to 3:1. The coating exhibits a high degree of solvent resistance and thermal stability.

3 Claims, 8 Drawing Figures

HIGH PERFORMANCE PRINTABLE COATINGS FOR IDENTIFICATION DEVICES

TECHNICAL FIELD

This invention relates to identification devices having a printable coating that is capable of withstanding rigorous conditions with respect to temperature and solvent exposure.

BACKGROUND ART

Identification devices comprise a wide variety of products such as, for example, marker sleeves, tags, labels and nameplates, that are intended to be applied to an article in order to provide specific identification of the article. Electrical wires, pipes and other conduits, and panels, are but a few examples of the many types of articles that often need to be identified in this fashion. In many instances, the end user of the identification device, typically the manufacturer of the product to be identified, must be able to print alpha-numeric indicia on the identification device in order to precisely identify a particular article. For example, aircraft manufacturers apply sleeves bearing a serial number to identify a specific wire, or tags to identify a specific bundle of wires, or labels or sleeves to identify a particular pipe in a hydraulic system. This requirement imposes a need for identification devices to which a user can apply identification data by printing systems typically available in plants and offices, such as with a computer printer, typewriter, or manually with a writing pen.

Various identification devices are made with plastic substrates, such as a sheet of plastic film for a marker sleeve or tag, and others are made with metallic substrates such as aluminum foil or metal plates. Many of these materials commonly used as substrates for indentification devices cannot be printed by means of the equipment noted above, such as computer printers and typewriters, and it is therefore necessary to apply a coating to the substrate that is capable of receiving and retaining printed indicia. Various types of printable coatings are known in the art that are satisfactory for use as coatings for identification devices that are to be subjected to relatively mild ambient conditions.

However, a special need has developed for identification devices that are capable of withstanding exposure to rigorous conditions, particularly with respect to temperature and solvents. This in turn has resulted in a need to develop printable coatings that can be used to receive and retain printing for such highperformance identification devices. Most printable coatings involve at least two essential elements, a filmforming polymer and inorganic solid particulates that are mixed with the filmforming polymer in order to impart ink receptivity and retention. One of the prior art coatings used for high-performance indentification devices is made with a polyimide film-forming polymer and solid particulate materials such as magnesium silicate, calcium carbonate and the like. The coating is applied to, for example, plastic substrates capable of withstanding high temperatures such as Teflon (Reg. Trademark) and similar materials. However, identification devices made with this prior art coating have at least two disadvantages which preclude their application to especially rigorous conditions: unsatisfactory resistance to very strong solvent fluids such as some hydraulic fluids and rather low flexibility so that the coatings will tend to crack when employed with an identification device that is placed about a round article, for example.

One of the principal objects of this invention was to develop a high-performance printable coating that can be used to produce an identification device that can withstand high temperatures and strong solvents. Another principal object was to develop a printable coating meeting the foregoing criteria which can also be formulated to provide a very flexible coating. A further main object was to develop identification devices employing substrates capable of withstanding relatively high temperatures and bearing a printable coating meeting the foregoing objectives.

SUMMARY OF THE INVENTION

Our present invention provides printable coatings for application to substrates to form high-performance identification devices wherein the coating includes a polymeric film-forming binder comprising a combination of a polyimide and, a fluorocarbon elastomeric polymer in a weight ratio of polyimide to fluorocarbon elastomer in the range of about 2:1 to 3:1. Ink-absorbent solid particulates are distributed in the binder. Various advantages and useful properties of the new coatings are set forth in the following detailed description.

BRIEF DESCRIPTION OF THE DRAWINGS

The invention is described in full detail hereinbelow by reference to the accompanying drawings, in which.

DESCRIPTION OF BEST MODES FOR CARRYING OUT THE INVENTION

(a) Identification Devices

The drawings illustrate several examples of identification devices to which a printable coating of the present invention can be applied.

Figure 1:
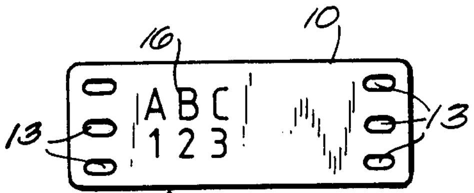
FIG. 1 is a plan view of an indentification device comprising a tag.
Figure 2:
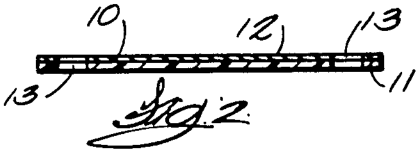
FIG. 2 is a side view of the tag of FIG. 1.
Figure 3:
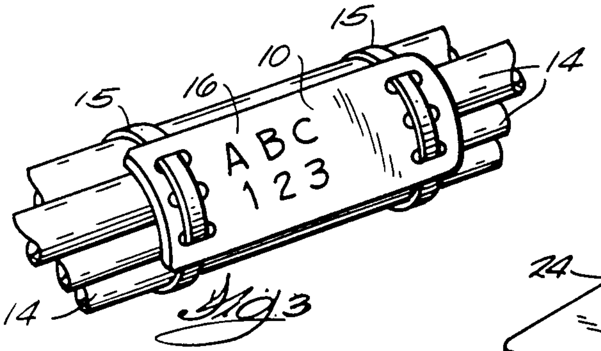
FIG. 3 is a perspective view of the tag of FIG. 1 applied to identify a bundle of wires.

FIGS. 1–3 illustrate an identification tag 10 comprising (see FIG. 2) a plastic film substrate 11 and a printable coating 12 of the present invention adherent to one surface of the substrate. Apertures 13 are formed along two opposed sides of the tag 10. The tag 10 is shown as applied to a group of electrical wires 14 in FIG. 3, the tag being retained on the group of wires by means of wire ties 15 that extend through some of the apertures and are locked together to hold the tag in place on the wires. As indicated in these figures, alpha-numeric data 16 have been applied to the printable coating 12 for identification purposes.

Figure 4:
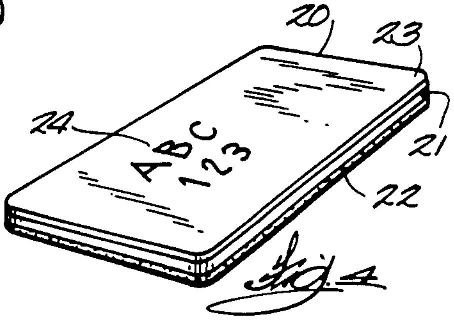
FIG. 4 is a perspective view of an identification device comprising a label.

FIG. 4 illustrates an identification device comprising a label 20 formed of a central substrate 21 which may be of plastic or metal, a layer 22 of adhesive coated onto the lower surface of the substrate, and a printable coating 23 of the present invention adherent to the upper surface of the substrate 21. Alpha-numeric data 24 are printed onto the coating 23 to be used to identify the article to which the label 20 will be attached. The label 20 is applied to an article for identification purposes by adhering the adhesive layer 22 to the article. The adhesive may be pressure-sensitive adhesive, solvent-activated adhesive, heat-activated adhesive, etc.

Figure 5:
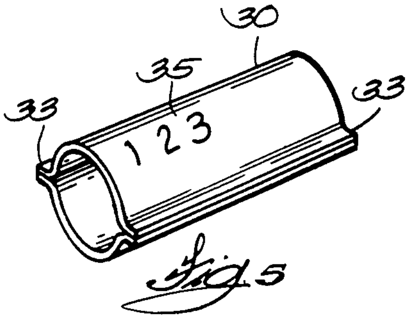
FIG. 5 is a perspective view of a marker sleeve identification device.
Figure 6:
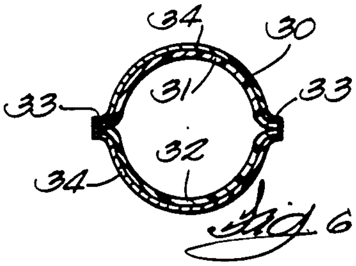
FIG. 6 is a sectional view of the marker sleeve of FIG. 5.

FIGS. 5 and 6 illustrate a marker sleeve 30 in perspective and sectional views, respectively, comprising plastic film substrates 31 and 32 sealed together along side edges 33 to form a tubular sleeve article. A printable coating 34 of the present invention is adherent to the exterior surface of each of the substrates 31 and 32. Indicia 35 are printed on the coating 34 to identify an article to which the sleeve 30 is to be applied. Marker sleeve 30 is typically used to identify electrical wires, pipes, conduits or other tubular articles.

Figure 7:
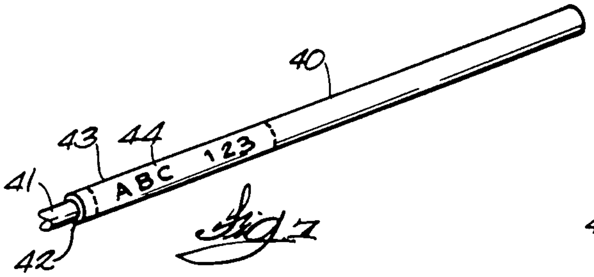
FIG. 7 is a perspective view of an electrical wire.
Figure 8:
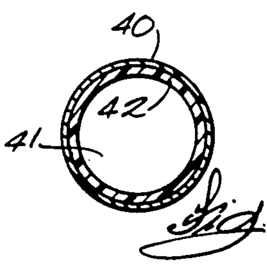
FIG. 8 is a sectional view of the wire of FIG. 7.

FIGS. 7 and 8 illustrate, in perspective and cross-section respectively, an electrical wire 40 comprising a central core 41 of conductive metal such as copper and a layer 42 of plastic insulation material about its outer surface. A section of the layer 42 indicated by the dashed lines in FIG. 7 is covered with a printable coating 43 of the present invention, which coating is adherent to the layer 42. Indicia 44 are printed on the coating 43 to identify the wire.

Tag 10, label 20, marker sleeve 30 and wire 40 are examples of some of the types of identification devices to which a printable coating of the present invention may be applied. More specific details of the new coatings are presented in the following part (b) and subsequent parts of this description.

(b) Coatings—General Description

The printable coatings of this invention, such as the coatings 12, 23, 34 and 43 described above, are to include two essential polymers as a film-forming binder, (1) a polyimide and (2) a fluorocarbon elastomer.

The polyimide component of the coating is a copolymer of a tetracarboxylic acid dianhydride and an organic diamine; the polyimide is to have an average molecular weight in the range of about 10,000 to 50,000. Polyimides have the imide group (—CONHCO—) in the polymer chain and are prepared by techniques well known in the art which generally involve reacting the co-reactants in an inert solvent under anhydrous conditions and then isolating the polyimide by precipitation from the solvent or by evaporating the solvent. Polyimides suitable for the present coatings are commercially available. Most usefully, the polyimide is a copolymer of benzophenone tetracarboxylic acid dianhydride (BTDA), more specifically 3,4,3′,4′-BTDA, and an aromatic diamine, having an average molecular weight in the range of about 10,000 to 50,000, such as that available commercially from Monsanto identified by their tradename Skybond 705.

The fluorocarbon elastomeric polymer component of the coating is a copolymer of vinylidene flouride and hexafluoropropylene or a terpolymer of vinylidene fluoride, hexafluoropropylene and a fluoroethylene; the fluorocarbon elastomer will generally have an average molecular weight in the range of about 1,000 to 5,000 and is to be soluble in MEK or acetone. In the latter terpolymer, the fluoroethylene co-monomer may be tetrafluoroethylene, bromotrifluoroethylene or bromotetrafluoroethylene. Fluorocarbon elastomers of the foregoing type may be prepared by techniques well-known in the art, see e.g. U.S. Pat. No. 4,214,060 incorporated herein by reference, and suitable elastomers are commercially available such as those identified by the tradenames Viton A, Viton A35, Viton B, Viton B50 and Viton GF sold by E. I. DuPont de Nemours and Company. A small amount of a curing agent for the fluorocarbon elastomer should be included in the coating, such as hexamethylenediame carbamate sold by duPont under the tradename Diak No. 1. It is necessary that both the polyimide and the fluorocarbon elastomer are compatible with one another in the proportions described below in order to form a useful printable coating of these two polymers that can be applied by usual coating techniques.

A third ingredient of the printable coatings is one or more inorganic solid particulate materials that are added to the coating to impart ink receptivity inasmuch as a coating comprising only the two polymers will not retain printing inks. The solids absorb printing inks and are therefore referred to herein and in the claims as ink-absorbent inorganic solid particulates. They are added to the polymers in finely-divided particulate form and are to be substantially uniformly distributed throughout the binder in the dried coatings. A wide variety of specific compounds can be used for the ink-absorbent particulates, for example, magnesium silicate, calcium silicate, silicon dioxide, barium sulfate, hydrated aluminum silicate, potassium aluminum silicate, calcium carbonate, and diatomaceous silica are especially useful compounds. A mixture of two or more of these compounds can also be used effectively in the coatings.

The coatings may also include other optional ingredients such as antioxidants and pigments such as titanium dioxide to impart opacity to the coatings.

The basic principle of the present invention is the discovery of the proportions of the polyimide and fluorocarbon elastomer film-formers that must be present in the coatings in order to obtain the desired results. In this connection, it has been found that the coatings, when dried, must contain a weight ratio of polyimide to fluorocarbon elastomer in the range of about 2:1 to 3:1 so as to meet the temperature and solvent resistance characteristics that are the objectives of this invention.

An effective procedure to prepare and apply the coatings is as follows. As the first step, the opacifying pigment such as titanium dioxide, when used in the coatings, is ground into about 20% of the total amount of the polyimide resin compound, such as with the ball mill. The grinding is continued to obtain a Hegman particle size of 7 or more. The balance of the polyimide to be used in the coating is added to the mixture after the grinding is completed. Next, the ink-absorbent solid particulate is added to the polyimide, together with a small amount of solvent, and the composition is blended to form a homogeneous mixture. Separately, such as with a rubber mill, pellets of the fluorocarbon elastomer are combined with the curing agent for the elastomer and an antioxidant, when used, and the mixture is milled together to form a homogeneous composition. The resulting blended mixture is then dissolved in MEK and the solution is combined with the polyimide solution. The resulting coating solution can be applied to a substrate by any of the conventional coating techniques, such as reverse roll coating. The coated substrate is then advanced through an oven to dry the coating by evaporation of the solvent. In the Examples set forth in part (d), the coatings were applied at a coating weight of about 15 pounds per 3,000 square feet of substrate to form a dried coating about 1 mil thick; however, other coating weights and thicknesses can be used.

Printable coatings of this invention will be shown to be capable of withstanding exposure to temperatures of 400° F. When the coatings are applied to a substrate to provide a high performance identification device, the substrate should also be capable of withstanding exposure temperatures of 400° F. For this purpose, suitable plastic substrates include fluorocarbon polymer films such as those commercially available under the registered trademarks Teflon (duPont) and Kynar (duPont), polyimide polymer films such as that commercially available under the registered trademark Kapton (duPont), metal and metal foil such as aluminum foil. The substrate may also comprise an article coated with a coating based upon one of the foregoing plastics, such as an electrical wire having a coating thereof over a layer of plastic insulation.

(c) Test Procedures

In the Examples which follow, the coatings of this invention and the coatings of several comparative examples were subjected to the following tests.

(1) Solvent resistance test. The test specimen consisting of a substrate with a coating on one surface and printing on the coating is immersed in Skydrol 500B-4 hydraulic fluid so as to completely cover the printed coating for a period of 1-3 hours at 70 degrees F. The specimen is then removed from the fluid and subjected to the print performance test of MIL-M81531(AS) dated May 2, 1967 according to which the printing is rubbed with a specified eraser for a specified number of times and thereafter visually examined for legibility at a reading distance of 14 inches. Skydrol 500B-4 is a well-known type IV fire resistant aviation hydraulic fluid sold by Monsanto; its specific composition is proprietary, but it is known to be a phosphate ester based hydraulic fluid having several additives including anti-erosion modifiers and viscosity modifiers.

(2) Thermal stability test. A test specimen consisting of a substrate with a coating on one surface and a legend printed on the coating is placed in an oven heated to 400 degrees F. and held in the oven for 30 days. The specimen is thereafter removed from the oven and the printing is visually examined for legibility due to discoloration of the coating and the coating is also checked for cracking by flexing the specimen.

(d) Examples

Coatings of the formulations set forth in Comparative Examples A, B, C and D and Examples 1-6 were prepared and applied as described in part (b) to a substrate film of fluorocarbon plastic commercially available from duPont under their registered trademark Teflon. The dried coatings of the test specimens of all the Examples were printed with a legend using a computer printer with a ribbon commercially available under the tradename Brady Series 2000, and the printed legend was examined for legibility before and after the solvent resistance test. The formulae of the Examples are all presented on a percentage by weight basis.

Examples 1-6 are examples of printable coatings according to this invention. The column headed "weight % of coating solution" lists the weight percentage of all compounds in each solution, which includes solvents and optional ingredients; the column headed "weight % of essential solids" lists the weight percent of the three essential solids ingredients, namely, polyimide, fluorocarbon elastomer and ink-absorbent inorganic solid particulates.

The parenthetical numbers following each compound in the compositions set forth in the Examples refer to the following headnotes:

(1) Polyimide of BTDA and aromatic diamine, Skybond 705, 19% resin by weight in solvent blend of methyl pyrrolidone and xylene.
(2) Fluorocarbon elastomer consisting of a terpolymer of vinylidene fluoride, hexafluoropropylene and fluoroethylene, Viton B50, average molecular weight about 2079.
(3) Solid particulates comprising, by weight, 39% magnesium silicate, 57% calcium carbonate and 4% silicon dioxide.
(4) Opacifying agent.
(5) Antioxidant.
(6) Curing agent for fluorocarbon elastomer.
(7) Solvent for fluorocarbon elastomer.
(8) Solvent added to adjust coating rheology and processability.
(9) Fluorocarbon elastomer consisting of a copolymer of vinylidene fluoride and hexafluoropropylene, Viton A35, average molecular weight about 1123.
(10) Fluorocarbon elastomer based upon vinylidene fluoride and hexafluoropropylene, specific composition kept proprietary by supplier, Viton GF, average molecular weight about 4785.
(11) FLuorocarbon elastomer consisting of terpolymer of vinylidene fluoride, hexafluoropropylene and fluoroethylene, Viton B, average molecular weight about 2117.

EXAMPLE 1

| | Weight % of Coating Solution | Weight % of Essential Solids |
|---|---|---|
| Polyimide (1) | 49.2% | 30.3% |
| Fluorocarbon elastomer (2) | 4.4 | 14.2 |
| Ink-absorbent solid particulates (3) | 17.2 | 55.5 |
| | | 100.00% |
| Other ingredients | | |
| Titanium dioxide (4) | 7.1 | |
| Magnesium oxide (5) | 0.6 | |
| Diak No. 1 (6) | 0.1 | |
| Solvent | | |
| Methyl ethyl ketone (7) | 20.0 | |
| n-butyl alcohol (8) | 1.4 | |
| | 100.00% | |

EXAMPLE 2

| | Weight % of Coating Solution | Weight % of Essential Solids |
|---|---|---|
| Polyimide (1) | 54.3% | 33.3% |
| Fluorocarbon elastomer (2) | 3.4 | 11.0 |
| Ink-absorbent solid particulates (3) | 17.2 | 55.7 |
| | | 100.00% |
| Other ingredient | | |
| Titanium dioxide (4) | 7.1 | |
| Magnesium oxide (5) | 0.5 | |
| Diak No. 1 (6) | 0.1 | |
| Solvent | | |
| Methyl ethyl ketone (7) | 15.5 | |
| n-butyl alcohol (8) | 1.9 | |
| | 100.00% | |

The coatings of Examples 3-5 are of the same composition as the coating of Example 1 except that they use different fluorocarbon elastomers as identified in headnotes (9)-(11).

EXAMPLE 3

| | Weight % of Coating Solution | Weight % of Essential Solids |
|---|---|---|
| Polyimide (1) | 49.2% | 30.3% |
| Fluorocarbon elastomer (9) | 4.4 | 14.2 |
| Ink-absorbent solid particulates (3) | 17.2 | 55.5 |
| | | 100.00% |
| Other ingredients | | |
| Titanium dioxide (4) | 7.1 | |
| Magnesium oxide (5) | 0.6 | |
| Diak No. 1 (6) | 0.1 | |
| Solvent | | |
| Methyl ethyl ketone (7) | 20.0 | |
| n-butyl alcohol (8) | 1.4 | |
| | 100.00% | |

EXAMPLE 4

| | Weight % of Coating Solution | Weight % of Essential Solids |
|---|---|---|
| Polyimide (1) | 49.2% | 30.3% |
| Fluorocarbon elastomer (10) | 4.4 | 14.2 |
| Ink-absorbent solid particulates (3) | 17.2 | 55.5 |
| | | 100.00% |
| Other ingredients | | |
| Titanium dioxide (4) | 7.1 | |
| Magnesium oxide (5) | 0.6 | |
| Diak No. 1 (6) | 0.1 | |
| Solvent | | |
| Methyl ethyl ketone (7) | 20.0 | |
| n-butyl alcohol (8) | 1.4 | |
| | 100.00% | |

EXAMPLE 5

| | Weight % of Coating Solution | Weight % of Essential Solids |
|---|---|---|
| Polyimide (1) | 49.2% | 30.3% |
| Fluorocarbon elastomer (11) | 4.4 | 14.2 |
| Ink-absorbent solid particulates (3) | 17.2 | 55.5 |
| | | 100.00% |
| Other ingredients | | |
| Titanium dioxide (4) | 7.1 | |
| Magnesium oxide (5) | 0.6 | |
| Diak No. 1 (6) | 0.1 | |
| Solvent | | |
| Methyl ethyl ketone (7) | 20.0 | |
| n-butyl alcohol (8) | 1.4 | |
| | 100.00% | |

The coating of Example 6 has a higher percentage of the ink-absorbent solid particulates than the coatings of the preceding examples.

EXAMPLE 6

| | Weight % in Coating Solution | Weight % of Essential Solids |
|---|---|---|
| Polyimide (1) | 44.7% | 22.9% |

-continued

| | Weight % in Coating Solution | Weight % of Essential Solids |
|---|---|---|
| Fluorocarbon elastomer (2) | 4.0 | 10.8 |
| Ink-absorbent solid particulates (3) | 24.6 | 66.3 |
| | | 100.00% |
| Other ingredients | | |
| Titanium dioxide (4) | 6.5 | |
| Magnesium oxide (5) | 0.6 | |
| Diak No. 1 (6) | 0.1 | |
| Solvent | | |
| Methyl ethyl ketone (7) | 18.2 | |
| n-butyl alcohol (8) | 1.3 | |
| | 100.00% | |

The substrates coated with coatings of the composition of Examples 1-6 were subjected to the solvent resistance test described above in part (c) after a legend was printed onto each coating using a computer printer. The printed legend was fully legible prior to immersing the test specimens in the Skydrol hydraulic fluid, and the legends were still legible after the specimens were removed from the hydraulic fluid and subjected to the print performance test. The specimens bearing coatings of Examples 1-6 were also subjected to the thermal stability test described in part (c); after removal from the oven following a dwell time of 30 days, the legends on all specimens were legible and there was either no discoloration of the coatings or only a slight degree of discoloration which did not impair legibility. Further, it was found that the coatings of Examples 1-6 are flexible coatings and can be used on identification devices that are curved or bent when applied as well as identification devices that remain flat when applied. The weight ratio of polyimide to fluorocarbon elastomer in Examples 1 and 3-6 is about 2:1, and the development work to date indicates that this is an optimum ratio for the two polymers in the coatings; the coating composition of Example 1 is the presently-preferred composition. The weight ratio of polyimide to fluorocarbon elastomer in Example 2 is about 3:1, which provides useful results but does not quite match the optimum performance exhibited by the 2:1 ratio of the other Examples.

Comparative Examples A and B set forth below are included to illustrate that the combination of polyimide and fluorocarbon elastomer polymers is essential to achieve the objectives of the present invention. The coating composition of Comparative Example A contains only polyimide as the polymeric film-former and the coating composition of Comparative Example B contains only fluorocarbon elastomer as the polymeric film-former.

COMPARATIVE EXAMPLE A

| | Weight % of Coating Solution | Weight % of Essential Solids |
|---|---|---|
| Polyimide (1) | 70.1% | 41.7% |
| Fluorocarbon elastomer | 0.% | 0.0% |
| Ink-absorbent solid particulates (3) | 18.6 | 58.3 |
| | | 100.0% |
| Other ingredients | | |
| Titanium dioxide (4) | 9.4 | |
| Solvent | | |
| n-butyl alcohol (8) | 1.9 | |

-continued

| | Weight % of Coating Solution | Weight % of Essential Solids |
|---|---|---|
| | 100.0% | |

COMPARATIVE EXAMPLE B

| | Weight % of Coating Solution | Weight % of Essential Solids |
|---|---|---|
| Polyimide (1) | 0.0% | 0.0% |
| Fluorocarbon elastomer (2) | 16.2% | 56.6% |
| Ink-absorbent solid particulates (3) | 12.4% | 43.4% |
| | | 100.0% |
| Other ingredients | | |
| Titanium dioxide (4) | 3.6% | |
| Magnesium oxide (5) | 2.4% | |
| Diak No. 1 (6) | 0.3% | |
| Solvent | | |
| Methyl ethyl ketone (7) | 65.1% | |
| | 100.0% | |

The substrates with the coatings of Comparative Examples A and B were subjected to the solvent resistance test of part (c) after a legend was printed on each coating using a computer printer. The printed legends were legible prior to immersing the test specimens in the Skydrol hydraulic fluid, but the legends were not legible after the specimens were removed from the hydraulic fluid and subjected to the print performance test. Thus, neither the coating of Comparative Example A nor that of Comparative Example B was capable of meeting the high solvent resistance exhibited by the coatings of Examples 1-6.

Comparative Examples C and D are coatings with a combination of polyimide and fluorocarbon elastomer polymeric film fomers in which the proportion of these polymers is outside the range of about 2:1 to 3:1.

COMPARATIVE EXAMPLE C

| | Weight % of Coating Solution | Weight % of Essential Solids |
|---|---|---|
| Polyimide (1) | 36.2% | 22.25% |
| Fluorocarbon elastomer (2) | 6.9% | 22.25% |
| Ink-absorbent solid particulates (3) | 17.2% | 55.5% |
| | | 100.0% |
| Other ingredients | | |
| Titanium dioxide (4) | 7.1 | |
| Magnesium oxide (5) | 0.9 | |
| Diak No. 1 (6) | 0.2 | |
| Solvent | | |
| Methyl ethyl ketone | 31.4 | |
| n-butyl alcohol (8) | 0.1 | |
| | 100.0% | |

COMPARATIVE EXAMPLE D

| | Weight % of Coating Solution | Weight % of Essential Solids |
|---|---|---|
| Polyimide (1) | 57.9% | 35.6% |
| Fluorocarbon elastomer (2) | 2.7 | 8.7% |
| Ink-absorbent solid particulates (3) | 17.2 | 55.7% |
| | | 100.0% |
| Other ingredients | | |

-continued

| | Weight % of Coating Solution | Weight % of Essential Solids |
|---|---|---|
| Titanium dioxide (4) | 7.1 | |
| Magnesium oxide (5) | 0.4 | |
| Diak No. 1 (6) | 0.1 | |
| Solvent | | |
| Methyl ethyl ketone (7) | 12.3 | |
| n-butyl alcohol (8) | 2.3 | |
| | 100.0% | |

The coating of Comparative Example C, consisting of a 1:1 weight ratio of polyimide to fluorocarbon elastomer was not useful because the two polymers were incompatible at this weight mixture. Therefore it was not possible to produce a suitable printable coating of this composition. Similar results were obtained with a coating comprising a weight ratio of polyimide to fluorocarbon elastomer of about 1.5:1. The test specimen with the coating of Comparative Example D was subjected to the solvent resistance test of part (c) after a legend was printed on the coating using a computer printer. While the printed legend was legible prior to immersing the test specimen in the Skydrol hydraulic fluid, the legend was not legible after the specimen was removed from the hydraulic fluid and subjected to the print performance test. Comparative Examples C and D demonstrate that a weight ratio of polyimide to fluorocarbon elastomer in the range of about 2:1 to 3:1 is critical in order to achieve the objectives of this invention.

The present invention is based upon the discovery that a combination of polyimide and fluorocarbon elastomer polymers as film-forming binders for a printable coating wherein the two polymers are present in a weight ratio of polyimide to fluorocarbon elastomer in the range of about 2:1 to 3:1 provides a printable coating capable of a high degree of solvent resistance and thermal stability. The specific percentage of the polymer film-formers and other ingredients of a suitable printable coating can vary within a wide range depending upon the nature of the substrate being coated, the coating method to be used to apply the coating, etc., while operating within the specified weight ratios for the film-formers. With respect to the solids comprising the polyimide, fluorocarbon elastomer and ink-absorbent solid particulates, development work to date indicates that suitable coatings can be provided containing, when dried, from about 20 to 40% polyimide, about 10 to 20% fluorocarbon elastomer, and about 50 to 70% ink absorbent solids, preferably in the range of about 20 to 30% polyimide, 10 to 15% fluorocarbon elastomer and 55 to 70% ink absorbent solids, all providing that the weight ratio of polyimide to fluorocarbon elastomer is in the range of about 2:1 to 3:1. It is anticipated, however, that coating compositions outside these percentage ranges can be formulated that will incorporate the basic principles of this invention and be useful for certain applications.

The foregoing detailed description sets forth several specific coating formulations according to the present invention so as to teach its principles to those knowledgeable in the art. However, since numerous modifications and changes will readily occur to those of ordinary skill in the coating art, it is not desired to limit the invention to the exact formulations herein described, and accordingly all suitable modifications and equivalents may be resorted to that remain within the spirit and scope of the present invention.

We claim:

1. In an identification device comprising a substrate and a printable coating adherent to a surface thereof, the printable coating including a polymeric film-forming binder and ink-absorbent solid particulates distributed in the binder, the improvement wherein:

the printable coating is applied to the substrate as a solution in which the polymeric film-forming binder is a combination of (i) a polyimide having an average molecular weight in the range of about 10,000 to 50,000 and (ii) a fluorocarbon elastomer having an average molecular weight in the range of about 1,000 to 5,000 and which is soluble in MEK or acetone, and the weight ratio of the polyimide to the fluorocarbon elastomer when the coating is dried is in the range of about 2:1 to 3:1.

2. An article according to claim 1 wherein:

the substrate is a plastic film or coating comprising a fluorocarbon polymer or polyimide, or metal.

3. An article according to claim 1 or 2, wherein:

the printable coating includes, on a weight basis, about 20 to 40% polyimide, about 10 to 20% fluorocarbon elastomer and about 50 to 70% ink absorbent inorganic solid particulates.

* * * * *